US009120928B2

(12) United States Patent
Liu et al.

(10) Patent No.: US 9,120,928 B2
(45) Date of Patent: Sep. 1, 2015

(54) METHOD FOR PREPARING WHITE CARBON BLACK MODIFIED BY SILANE COUPLING AGENT

(75) Inventors: Li Liu, Beijing (CN); Fa zhong Zhang, Beijing (CN); Ying yan Mao, Beijing (CN); Yan Li, Beijing (CN); Shui Hu, Beijing (CN); Shi peng Wen, Beijing (CN); Li qun Zhang, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 205 days.

(21) Appl. No.: 13/812,956

(22) PCT Filed: Jul. 29, 2011

(86) PCT No.: PCT/CN2011/077769
§ 371 (c)(1),
(2), (4) Date: Jan. 29, 2013

(87) PCT Pub. No.: WO2012/162937
PCT Pub. Date: Dec. 6, 2012

(65) Prior Publication Data
US 2013/0131357 A1 May 23, 2013

(30) Foreign Application Priority Data

Jun. 2, 2011 (CN) .......................... 2011 1 0147594

(51) Int. Cl.
*C09C 1/30* (2006.01)
*B82Y 30/00* (2011.01)
(52) U.S. Cl.
CPC ................ *C09C 1/3081* (2013.01); *B82Y 30/00* (2013.01); *C01P 2004/51* (2013.01); *C01P 2004/62* (2013.01); *C01P 2006/12* (2013.01)
(58) Field of Classification Search
CPC .... C09C 1/3081; C01P 2004/64; C01B 33/12
USPC .................. 423/335–340; 427/215, 220, 384, 427/443.2; 549/215; 556/462, 429, 425, 556/450, 424
See application file for complete search history.

(56) References Cited

U.S. PATENT DOCUMENTS

2005/0131107 A1* 6/2005 Okel et al. .................... 523/216

FOREIGN PATENT DOCUMENTS

| CN | 1654489 A | * | 8/2005 |
| CN | 1751795 A | | 3/2006 |
| CN | 101531835 A | | 9/2009 |
| JP | 2008-137854 A | | 6/2008 |

OTHER PUBLICATIONS

PCT/CN2011/077769 International Search Report by Shaohua Chi mailed Mar. 15, 2012.

* cited by examiner

*Primary Examiner* — Anthony J Zimmer
(74) *Attorney, Agent, or Firm* — RatnerPrestia

(57) ABSTRACT

The invention relates to a method for preparing silica modified by a silane coupling agent. The method comprises the following steps: preparing a kind of coupling agent sol solution by mixing the solvent, water, catalyst and coupling agent; uniformly dispersing silica into the sol solution by means of ultrasonic dispersion or shear dispersion to achieve a turbid solution with uniform dispersion and ideal particle size; and then stirring the turbid solution at a constant speed to make the coupling agent sol reacting with silica to prepare highly hydrophobic silica modified by the coupling agent through controlling the temperature and reaction time. The coupling agent sol solution is obtained by a sol-gel process and silica is uniformly dispersed in the coupling agent sol solution through combined action of various dynamic means to ensure the sufficient reaction between silica and coupling agent, thus to obtain silica modified by the coupling agent.

7 Claims, No Drawings

METHOD FOR PREPARING WHITE CARBON BLACK MODIFIED BY SILANE COUPLING AGENT

CROSS-REFERENCE TO RELATED APPLICATIONS

This application is a U.S. National Phase Application of PCT International Application PCT/CN2011/077769, filed Jul. 29, 2011, which claims priority to Chinese Application No. 201110147594.5, filed Jun. 2, 2011, the contents of which are incorporated herein by reference in their entireties for all purposes.

TECHNICAL FIELD

The invention relates to a method for preparing silica modified by a silane coupling agent and belongs to the fields of development and utilization of silica.

BACKGROUND OF THE INVENTION

Silica with a chemical name of hydrated amorphous silica or colloidal silica ($SiO_2 \cdot nH_2O$) is a white, non-toxic and amorphous fine powder. $SiO_2$ content in silica is greater (>90%), primary particle size is generally 10-40 nm and aggregation of the particles is due to more hydrophilic hydroxy groups on the surface, which can absorb water easily. The relative density of silica is 2.319~2.653 t/m3 and melting point is 1750° C. It is insoluble in water and acid but soluble in alkali and hydrofluoric acid. Moreover, silica has the advantages of good porosity, large inner surface area, high dispersibility, light weight, good chemical stability, resistance to high temperature, resistance to combustion, good electrical insulation, and so on. Further, silica has a crosslinked structure randomly connected by a covalent bond of —O—Si—O—, the structural unit of which may be aggregated into a once, twice or even three times agglomerate. Silica is mainly used as a kind of filler for rubbers, plastics, synthetic resins and paints and also can be used as a kind of lubricant and an insulating material. Currently, 70% of silica in the world is used as a kind of good reinforcing agent in rubber industry for improving bonding performance and tear resistance.

Silica is hydrophilic owing to internal silicone, active silanol groups on outer surface and the adsorbed water; so, it is difficult to be wet and dispersed in an organic phase; moreover, the agglomerates are always inclined to agglomerate because of greater surface energy coming from the hydroxy groups on the surface. So, application performances of the products are affected, e.g. in the rubber curing system, unmodified silica can not be well dispersed in the polymer so that coupling bonds among fillers and the polymers are difficult to form, which will reduce curing efficiency and reinforcement properties. Surface modification of silica is to eliminate or reduce the amount of the active silanol groups through reacting the hydroxy groups with a certain chemical substances by a certain process, which can make the products change from hydrophilicity to hydrophobicity as well as increase its dispersibility in the polymers.

Currently, the modification methods of silica include dry modification, wet modification and hot-pressing modification. The wet modification has the advantages of small amount of a modifying agent and low cost, however, large amounts of organic solvents used make post-processing complicated and could easily lead to environmental pollution. The dry modification avoids the disadvantages of the wet modification with a simple process, a large processing capacity, a simple post-processing, high reaction efficiency, but still has the disadvantages of stringent operating conditions, large amounts of the modifying agent, high modification cost and nonuniform modification. Moreover, the hot-pressing modification has the drawbacks of high energy consumption, high equipment requirements, relatively small processing load, large amounts of the modifying agent and nonuniform modification.

SUMMARY OF THE INVENTION

The invention provides a novel method for preparing silica modified by a silane coupling agent. A sol treatment solution of the silane coupling agent is prepared by a sol method and then reacts with silica to obtain the final product. The prepared silica modified by the silane coupling agent belongs to a groundbreaking research.

Technical scheme of the invention is: a hydrolysis using a coupling agent, a solvent, water and a catalyst as raw materials is performed to prepare the sol solution of the coupling agent. Then silica is added into the sol solution and fully stirred. Finally dehydration condensation of the silanol groups between the sol solution and silica is performed to obtain silica modified by the silane coupling agent.

Solation of the coupling agent: water is added into the organic solvent and pH value is adjusted to below 6 by dripping an acid or over 8 by dripping an alkali, and then the coupling agent is added at a molar ratio of the coupling agent to water of 1:0.1~1:10000; after standing for 0.5~48 h, the solution becomes clear and transparent, which means the hydrolysis is completed, and the stabilized sol solution of the coupling agent is formed.

Dispersing of silica: silica is added into the sol solution of the coupling agent and its amount is determined according to the requirements of the processing. Because silica is classified as precipitated and fumed silica, the amount is different. The amount of the precipitated silica is less than 10 g/ml, whereas that of the fumed silica is less than 1 g/ml using g/ml as a unit, which is a mass to volume ratio of silica to the sol solution.

After added into the sol solution, silica is fully dispersed in coupling agent sol solution by one of the following dispersing methods; A uniformly-dispersed turbid solution is obtained through ultrasonic dispersion for over 1 h and 1~100 times under an ultrasonic frequency of over 20 kHz. The time for an ultrasonic dispersion process is 10 min~1 h. After every ultrasonic dispersion is completed, the turbid solution is stirred to lower the temperature to room temperature, and then the next ultrasonic dispersion is performed.

Alternatively, shear dispersion can be used when silica is added into the sol solution of the coupling agent, a turbid solution with uniform dispersion and ideal particle size is obtained through a plurality of stirring and shearing at a shearing rate of over 1000 r/min for 1~100 times using a shear blender. The time for a shear dispersion process is 10 min~10 h. After every shear dispersion is completed, the turbid solution is stirred to lower the temperature to room temperature, and then the next shear dispersion is performed.

Or a simple stirring method is used, a uniformly-dispersed turbid solution is obtained at a stirring rate of greater than 300 r/min and for 0.5~168 h.

Modification of silica by the coupling agent and post-processing: the dispersed turbid solution is stirred at room temperature and evaporates to a solution weight of 0.1%-50% of the primary weight, further heated at 50~80° C. and stirred for 0.5~120 h, and then heated at 81~260° C. for 0.5~48 h for the reaction. Finally, silica modified by the coupling agent is obtained after drying and crushing processes.

In addition to the clear need for heating for the above steps, the temperature of the remaining steps should be controlled to less than 50° C. to avoid a self-polymerization of the coupling agent sol to induce a gelation, through which solid precipitates are formed.

Solation of the Silane Coupling Agent

The silane coupling agent is an organosilicon compound having two different reactive groups in the molecule and can form an bonding layer of inorganic phase—the silane coupling agent—organic phase to acquire a better bond strength between boundary layers of the organic and the inorganic substance. Now, there are 100 kinds of the silane coupling agents, which are used in various fields. Silica treated by the silane coupling agent can improve rolling resistance of rubber products obviously without losing other properties, so it is widely used in the tire industry.

The end group of the common silane coupling agent is generally the —OR group with lower reactivity. A direct alcohol condensation between the coupling agent and silica has the disadvantages of harsh reaction conditions, low reactivities and poor modification effects. So, the hydrolysis of the coupling agent is firstly performed to remove ethanol for preparing the sol solution of the coupling agent. Because the reactivity of the hydrolyzed coupling agent is greater, it is beneficial to the latter dehydration condensation between the coupling agent and silica.

The hydrolytic reagent used for the hydrolysis reaction could be sodium hydroxide solution, diluted acid or concentrated acid, and sometimes could be aqueous solutions of potassium hydroxide, calcium hydroxide, sodium bisulfite according to the properties of the coupling agent. This is so-called alkaline hydrolysis and acid hydrolysis. The alkali or acid is selected according to the classification of the coupling agents to avoid other chemical reactions between the alkali or acid and the coupling agent. The hydrolysis needs different pH values depending on the different coupling agents. Therefore the hydrolysis reaction is divided into acid hydrolysis and alkaline hydrolysis, and the coupling agents used here can also be simply divided into the acid hydrolysis coupling agent and the alkaline hydrolysis coupling agent.

The sol-gel method uses highly chemical-active ingredient-containing compounds as precursor, then these raw materials are uniformly mixed in the liquid phase for the hydrolysis and condensation to form a stable and transparent sol system; sequently, a slow polymerization proceeds among the colloidal particles after aging of the sol to form a gel with a three-dimensional network structure and the gel network is filled with the solvents losing fluidity; and finally, the gel is dried, sintered and cured to obtain a material with a substructure of molecular level or even nanoscale. The sol is a colloidal system having the characteristics of a liquid, in which the particles dispersed is a solid or a macromolecule with the size of 1~1000 nm. The gel refers to a colloidal system having the characteristics of a solid, in which the substances are dispersed to form a continuous network skeleton filled with liquid or gas; however, the content of the dispersed phase is very low, typically 1%~3%. During the modification process of silica, the sol solution of the coupling agent formed after the hydrolysis of the coupling agent can easily participates in gelation to form a gel; then the gel will self-polymerize to form a self-aggregate, which is unuseful for the modification of silica. Therefore, to obtain good silica modified by the coupling agent, the first thing to do is the preparation of a stable sol solution of the coupling agent. Because the sol-gel reaction is greatly influenced by the water content and pH value, the selection of the solvent, the determination of the water content and the adjustment of pH value are all selected according to the classification of the coupling agent during the preparation of the solution. When the hydrolysis is catalyzed by an acid, pH value is so small that the gelation will be accelerated, whereas the hydrolysis will be slowed down. When the hydrolysis is catalyzed by an alkali, pH value is so large that the gelation will be accelerated, whereas the hydrolysis will be slowed down. Therefore, the choice of pH values requires an appropriate range, which can not be too large or too small, and also must meet the nature of the coupling agent itself.

To guarantee a molar ratio of 1:0.1~1:1000 of the coupling agent to water and further to meet the requirements of the hydrolysis, deionized water with a predetermined amount and a volume fraction of 0.1%~100% is added into one of the following common organic solvents to form a solution: anhydrous ethanol, methanol, acetone, n-propanol, isopropanol, ethylene glycol, propylene glycol, dimethyl formamide and dimethyl sulfoxide. Then the coupling agent is added into the solution and pH value is adjusted according to the characteristics of the needed coupling agent. If the hydrolysis is catalyzed by an acid and the coupling agent can exist stably in the sol solution and the acid solution, the acid is added in a dropwise manner to adjust pH value to less than or equal to 6 to obtain a solution; or if the hydrolysis is catalyzed by an alkali and the coupling agent can exist stably in the sol solution and the alkaline solution, the alkali is added in a dropwise manner to adjust pH value to greater than or equal to 8 to obtain a solution. The prepared solution is allowed to stand for 0.5-48 h until the solution becomes clear and transparent, which means that the hydrolysis is completed, the gelation is over and a stable sol solution of the coupling agent is formed.

Modification of Silica

For modifying silica, we separate the modification of silica into two parts. The first part is the dispersing part of silica. It is required to uniformly disperse silica into the prepared coupling agent sol solution in order to obtain silica with a good modification effect. This part is used as a preparation for the following post-processing part of the modifying agent. The second part is the modification and post-processing part. It mainly comprises reacting silica with the coupling agent in the solution and treating silica modified by the coupling agent with the processes of washing, drying, crushing and others to obtain silica modified by the coupling agent.

The first part is the dispersion of silica: in order to increase the condensation effect of silica and the silane coupling agent sol solution, it is required to uniformly disperse silica into the solution firstly, and then the modified silica with a good treatment effect is obtained. However, due to the different properties of the two kinds of silica, the viscosities of the solutions after silica is added are not the same. So it is impossible to disperse silica merely by one dispersion process. For dispersing the precipitated silica, a combination method of shearing and stirring is used to obtain silica dispersing solution with ideal particle size and uniform dispersion. But when the content of the precipitated silica is lower than 1 g/ml, it is possible to disperse silica only by stirring. For treating the fumed silica, the methods of ultrasonic dispersion and stirring at a constant rate are employed to obtain silica dispersing solution with ideal particle size and uniform dispersion. When the content of the fumed silica is lower than 0.1 g/ml, a combination method of shearing and stirring at a constant rate is used to obtain silica dispersing solution with ideal particle size and uniform dispersion.

Ultrasonic wave is a sound wave with a frequency of $2*10^4$-$10^9$ Hz. Ultrasonic technology developed on the basis of ultrasonic wave has been widely used in many fields. Ultrasonic cavitation effect is probably the key that ultrasonic wave generates plenty of energy and accelerates dispersion, namely the energy is released along with the destruction of the microbubbles when the ultrasound is in a liquid medium, which can generate a high-temperature, high-pressure and high-energy environment. According to the calculation, it can reach 2000-3000° C. and several hundreds atmospheric pressure within a millisecond interval. In the dispersing system, this energy is used to break interaction force among the molecules of the dispersed material itself, accelerate the dispersion of materials; and meanwhile, a second-order effect caused by the absorption of the ultrasound and resonance between the medium and the vessel also can increase the dispersing effect.

Because silica, in particular to the fumed silica, has strong hydrogen bond with the solution, common stirring is difficult to uniformly disperse silica into the solution. So, ultrasonic wave could be used to disperse silica uniformly, and then the contact area between silica and the silane coupling agent increases. A combination effect of some processes like shear dispersion and stirring could be used to disperse silica and ensure silica with ideal particle size and uniform dispersion in the solution.

The weighed silica is added into the coupling agent sol solution, wherein the amount of the precipitated silica is less than 10 g/ml, whereas that of the fumed silica is less than 1 g/ml using g/ml as a unit, which is a mass to volume ratio of silica to the sol solution. This could ensure silica existing in the solution stably and uniformly to obtain a mixed solution. After silica is added, an ultrasonic generator is put into the mixed solution for ultrasonic dispersion. The time of ultrasonic dispersion should ensure more than 2 hours to obtain a turbid solution with uniform dispersion. Because a plurality of heat generated during the process of ultrasonic dispersion will increase the system temperature, it is necessary to have a cooling process during the process. To avoid so much heat generated by the ultrasonic generator during the working process, the ultrasonic generator should be stopped for a while every 10 min-1 h. In the interval of working process of the ultrasonic generator, the system is stirred at a slow and constant rate to lower the system temperature to less than 50° C. To prevent the precipitation of silica, the rate of the stirring should be constant and more than 30 r/min, and the common stirring time is 10 min-5 h. Next ultrasonic operation starts after the system temperature decreases. The same process repeats 1~100 times and then the turbid solution with ideal particle size and uniform dispersion is obtained.

For the precipitated silica, the shearing method could also be used to obtain the turbid solution with ideal particle size and uniform dispersion. After the precipitated silica is added into the coupling agent sol solution to form a mixed solution, to achieve above target, the shear dispersion used for the mixed solution needs to repeat for 1-100 times and 10 min-10 h/time. After each shear dispersion, the system temperature increases, so it is necessary to conduct cooling process to lower the temperature to less than 50° C. during the shear dispersion process. During the cooling process it is necessary to stir to avoid the precipitation of silica with a stirring rate of higher than 30 r/min and 10 min-5 h per time. Next shearing will start after the system temperature decreases. The stirring method could also be used to disperse silica into the solution uniformly with a necessary stirring rate of higher than 500 r/min and 30 min-168 h per time. After the precipitated silica is added into the coupling agent sol solution, the turbid solution is pouring into a blender to be stirred and dispersed; moreover, the stirring rate is higher than 500 r/min and the time is 30 min-168 h. Much heat is generated during every stirring process but the heating rate is less than those of the other two methods. So during the stirring process, the blender is stopped every 30 min-60 min and the lid is opened to exchange heat between the system and the external environment to lower the system temperature. The time for opening the lid and exchanging heat is generally 10 min-60 min. Finally, the silica turbid solution uniform dispersion is obtained.

The second part is the modification and post-processing of silica: for traditional treatment of silica, high-temperature treatment is used for the hydrolysis of the silane coupling agent and the reaction with silica surface hydroxyl groups at the same time to modify the silane coupling agent. Owing to the low reactivity of the coupling agent and inclined self-polymerization of the hydrolyzed coupling agent, it is different to guarantee the degree of the treatment. A stable sol solution formed by the hydrolysis of the coupling agent successfully inhibits the happen of the self-polymerization and guarantees full contact of silica with the coupling agent through a variety of dispersion processes. The process for modifying the coupling agent has the advantages of simple treatment process and significant treatment effects. The hydrolysis is accelerated through stirring, which could cause the full contact of silica and the hydrolysate of the coupling agent in the turbid solution. After the solvents evaporate, the mixture is heated to accelerate the reaction rate of the hydrolysis, and that can be.

The solvents in the turbid solution dispersed by ultrasonic dispersion are stirred for 5-240 h and evaporate at room temperature until the mass of the left solution is 0.1%-50% of the primary weight. Then the turbid solution is dried at 50~80° C. and continuously stirred for 0.5-120 h; after the oven temperature is adjusted to 81~260° C., the turbid solution is dried for 0.5-48 h to obtain primarily modified silica. The primarily modified silica is under washing, drying and crushing processes to obtain silica modified by the coupling agent.

The coupling agent used in the present invention can be a variety of coupling agents, including a silane coupling agent, and the other coupling agents which could be hydrolyzed. Wherein the silane coupling agent includes N-(β-aminoethyl)-γ-aminopropylmethylbimethoxysilane, N-(β-aminoethyl)-γ-aminopropyltrimethoxy(ethoxy)silane, methyltriethoxysilane, vinyltriethoxysilane, vinyltrimethoxysilane, γ-glycidyloxypropyltrimethoxysilane, bis-(γ-triethoxysilylpropyl)-tetrasulfide, γ-mercaptopropyltrimethoxysilane, bis-(gamma-(triethoxysilyl)propyl)-disulfide, γ-aminopropyltriethoxysilane, γ-(methacryloxy)propyltrimethoxysilane; chlorosilane (RmSiXn) includes dimethyldichlorosilane (DMDC); siloxane-based organic silicon compounds include polydimethylsiloxane (PDM), hexamethyldisiloxane (M2), octamethyltrisiloxane (MDM), tetradecamethyltetrasiloxane (DM2M), 1,3,5,7-tetramethyl-1,3,5,7-tetravinylcyclotetrasiloxane (TMTv-CTSO), 1,3,5,7-tetramethyl-1,3,5,7-tetrahydrocyclotetrasiloxane (TMTH-CTSO), hexamethylcyclotrisiloxane (D3) octamethylcyclosiloxane (D4), trimethylethoxysilane (TMEO), methyltrimethoxysilane (MTMO), vinyltriethoxysilane (VEO), tetrabutoxysilane, hexamethylethylsilazane (HME), hexamethyldisilazane (HMDZ), and a silazane. Suitable amount of the coupling agent varies with the coupling agent species and generally is 0.01%~50% of the mass fraction to silica.

Wherein the coupling agents hydrolyzed by an alkali include: N-(β-aminoethyl)-γ-aminopropylmethylbimethoxysilane, N-(β-aminoethyl)-γ-aminopropyltrimethoxy (ethoxy)silane, γ-aminopropyltriethoxysilane.

Wherein the coupling agents hydrolyzed by an acid include: methyltriethoxysilane, vinyl triethoxysilane, vinyltrimethoxysilane, γ-glycidyloxypropyltrimethoxysilane, γ-(methacryloxy)propyltrimethoxysilane, dimethyldichlorosilane, silazane, bis-(γ-triethoxysilylpropyl)-tetrasulfide, γ-mercaptopropyltrimethoxysilane, bis-(gamma-(triethoxysilyl)propyl)-disulfide, polydimethylsiloxane, hexamethyldisiloxane, octamethyltrisiloxane, tetradecamethyltetrasiloxane, 1,3,5,7-tetramethyl-1,3,5,7-tetravinylcyclotetrasiloxane, 1,3,5,7-tetramethyl-1,3,5,7-tetrahydrocyclotetrasiloxane, hexamethylcyclotrisiloxane, octamethylcyclosiloxane, trimethylethoxysilane, methyltrimethoxysilane, vinyltriethoxysilane, tetrabutoxysilane, hexamethylethylsilazane, hexamethyldisilazane.

The hydrolysis in the invention is performed at below 50° C. to guarantee the needed temperature of the sol solution formed after the hydrolysis. High temperature could induce the self-polymerization of the coupling agent during the hydrolysis to form self-agglomerate and precipitates. Further, the coupling agent sol is unstable at high temperature and easily forms a gel to precipitate. So, in addition to the special need for heating for the process in the invention, the temperature of the remaining steps should be controlled to less than 50° C. to avoid the self-polymerization of the coupling agent or the gelation of the coupling agent sol, through which solid precipitates are formed.

The beneficial effects of the present invention: a sol solution of silanol in the invention is obtained through hydrolyzing the silane coupling agent, and then silica is treated with the silane coupling agent in the sol solution to obtain silanized silica; and the invention belongs to a groundbreaking research. The method has the advantages of simple operation, high effectiveness, simple post-processing process, low energy consumption and no pollution to the environment, and all wastes can be recycled.

The method that silica is treated with the hydrolysate of silane coupling agent can improve every index of silica, and meantime the overall process of the silica modification is newly established. The obtained treated silica is easily processable and energy consumption is reduced during the process, which reaches the energy saving and emission reduction. Moreover, silica obtained has high filling amount and can be used for preparing highly filled silica and improving the mechanical properties of a polymer.

The present invention has important practical significance to the development of highly-filled and easily-processable silica and makes a significant contribution to further expand the use scope of silica.

DETAILED DESCRIPTION OF THE INVENTION

The precipitated silica used is from Degussa VN3 and the fumed silica is from Degussa A200.

Embodiment 1

To a mixture of 1 L of anhydrous ethanol and 1 ml of deionized water, hydrochloric acid was added to obtain a solution with a pH value of 1, and then 0.03 g of bis-(γ-triethoxysilylpropyl)-tetrasulfide was added into the solution. The mixed solution was then allowed to stand for 2 h until a clear and transparent solution was formed. 300 g precipitated silica was weighed and added into the solution to obtain another mixture. The mixture was under a shear dispersion process using a shearing machine with the shear rate of 3000 rpm for 30 min/time, and the procedure was repeated for 5 times to obtain a turbid solution. The turbid solution was stirred at a constant rate of greater than 30 r/min to lower the temperature to room temperature after each shear dispersion process to avoid precipitation of silica. After the turbid solution was stirred for 10 min and its temperature was lowered to room temperature, the next shear dispersion process was performed. The turbid solution treated by the shear dispersion process was transferred into a fume chamber and continuously stirred at a stirring rate of 300 r/min at room temperature. After stirred for 72 h, the solution substantially evaporated to dryness, and viscous and preliminarily surface-treated silica was obtained. Now, silica was transferred into an oven and dried at 80° C. for 6 h; after the oven temperature was adjusted to 150° C., silica was dried for another 2 h to obtain the precipitated silica modified by the coupling agent.

Silica modified by the silane coupling agent was obtained after the washing, drying and crushing processes. In addition to the need for heating for the steps, the temperature of the remaining steps should be controlled to less than 50° C. to avoid the self-polymerization of the coupling agent, which affected the modification effects. (The treating steps after silica was oven dried at 150° C. include washing, drying and crushing processes which were used in all embodiments, and the steps were only described in Embodiment 1 and those in the later embodiments were omitted. Similarly, that the temperature of the steps without heating should be controlled to less than 50° C. in the system was only described in Embodiment 1 and those in the later embodiments were omitted, however, and the temperature control was stringent in all embodiments.)

Embodiment 2

To a mixture of 1 L of anhydrous ethanol and 1 ml of deionized water, hydrochloric acid was added to obtain a solution with a pH value of 3, and then 0.03 g of hexamethylethylsilazane was added into the solution. The mixed solution was then allowed to stand for 2 h until a clear and transparent solution was formed. 0.3 g of precipitated silica was weighed and added into the solution to obtain another mixture. The mixture was under a shear dispersion process using a shearing machine with the shear rate of 1000 rpm for 30 min/time, and the procedure was repeated for 5 times to obtain a turbid solution. The turbid solution was stirred to at a constant rate of greater than 30 r/min to lower the temperature to room temperature after each shear dispersion process to avoid precipitation of silica. After the turbid solution was stirred for 10 min and its temperature was lowered to room temperature, the next shear dispersion process was performed. The turbid solution treated by the shear dispersion process was transferred into a fume chamber and continuously stirred at a stirring rate of 300 r/min, after stirred for 168 h, the solution evaporated to a constant weight, and viscous and preliminarily surface-treated silica was obtained. Now, silica was transferred into an oven and dried at 80° C. for 6 h; after the oven temperature was adjusted to 150° C., silica was dried for another 2 h to obtain the precipitated silica modified by the coupling agent. The following processing steps and requirements were the same as in Embodiment 1.

Embodiment 3

To a mixture of 1 L of anhydrous ethanol and 1 ml of deionized water, hydrofluoric acid was added to obtain a solution with a pH value of 3, and then 30 g of γ-(methacryloxy)propyltrimethoxysilane was added into the solution. The mixed solution was then allowed to stand for 12 h until a clear and transparent solution was formed. 300 g of precipitated silica was weighed and added into the solution to obtain another mixture. The mixture was under a shear dispersion process using a shearing machine and at a shear rate of 3000 rpm for 30 min/time, and the procedure was repeated for 15 times to obtain a turbid solution. The turbid solution was stirred at a constant rate of greater than 30 r/min to lower the temperature to room temperature after each shear dispersion process to avoid precipitation of silica. After the turbid solution was stirred for 10 min and its temperature was lowered to room temperature, the next shear dispersion process was performed. The turbid solution treated by the shear dispersion process was transferred into a fume chamber and continuously stirred at a stirring rate of 300 r/min, after stirred for 72 h, the solution substantially evaporated to dryness, and viscous and preliminarily surface-treated silica was obtained. Now, silica was transferred into an oven and dried at 80° C. for 6 h; after the oven temperature was adjusted to 150° C., silica was dried for another 2 h to obtain the precipitated silica modified by the coupling agent. The following processing steps and requirements were the same as in Embodiment 1.

Embodiment 4

To a mixture of 1 L of anhydrous ethanol and 1 ml of deionized water, sulphuric acid was added to obtain a solution with a pH value of 1, and then 300 g of bis-(gamma-(triethoxysilyl)propyl)-disulfide was added into the solution. The mixed solution was then allowed to stand for 18 h until a clear and transparent solution was formed. 600 g of precipitated silica was weighed and added into the solution to obtain another mixture. The mixture was under a shear dispersion process using a shearing machine and at a shear rate of 3000 rpm for 30 min/time, and the procedure was repeated for 50 times to obtain a turbid solution. The turbid solution was stirred at a constant rate of greater than 30 r/min to lower the temperature to room temperature after each shear dispersion process to avoid precipitation of silica. After the turbid solution was stirred for 1 h and its temperature was lowered to room temperature, the next shear dispersion process was performed. The turbid solution treated by the shear dispersion process was transferred into a fume chamber and continuously stirred at a stirring rate of 300 r/min, after stirred for 24 h, the solution substantially evaporated to dryness, and viscous and preliminarily surface-treated silica was obtained. Now, silica was transferred into an oven and dried at 80° C. for 12 h; after the oven temperature was adjusted to 150° C., silica was dried for another 2 h to obtain the precipitated silica modified by the coupling agent. The following processing steps and requirements were the same as in Embodiment 1.

Embodiment 5

To a mixture of 1 L of methyl alcohol and 1 ml of deionized water, hydrochloric acid was added to obtain a solution with a pH value of 6, and then 300 g of methyl triethoxysilane was added into the solution. The mixed solution was then allowed to stand for 18 h until a clear and transparent solution was formed. 4 kg of precipitated silica was weighed and added into the solution to obtain a mixture. The mixture was dispersed by a blender to obtain a turbid solution with a frequency of 30 min/time for 6 times, that was 3 h. After every stirring dispersion process, the lid of the blender was opened for ventilation for 30 min, through which the temperature of the turbid solution was reduced to room temperature. Then the turbid solution treated by the stirring dispersion process was transferred into a fume chamber and continuously stirred at a stirring rate of 30 r/min to obtain a solution. The solution was stirred for 24 h and the solvents evaporated to a constant weight to obtain viscous and preliminarily surface-treated silica. Now, silica was transferred into an oven and dried at 80° C. for 12 h; after the oven temperature was adjusted to 150° C., silica was dried for another 2 h to obtain the precipitated silica modified by the coupling agent. The following processing steps and requirements were the same as in Embodiment 1.

Embodiment 6

To a mixture of 1 L of acetone and 1 ml of deionized water, sulfurous acid was added to obtain a solution with a pH value of 5, and then 0.3 g of vinyl triethoxysilane was added into the solution. The mixed solution was then allowed to stand for 4 h until a clear and transparent solution was formed. 3 kg of precipitated silica was weighed and added into the solution to obtain a mixture. The mixture was dispersed by a blender to obtain a turbid solution with a frequency of 30 min/time for 6 times, that was 3 h. After every stirring dispersion process, the lid of the blender was opened for ventilation for 30 min, through which the temperature of the turbid solution was reduced to room temperature. Then the turbid solution treated by the stirring dispersion process was transferred into a fume chamber and continuously stirred at a stirring rate of 30 r/min to obtain a solution. The solution was stirred for 24 h and the solvents evaporated to a constant weight to obtain viscous and preliminarily surface-treated silica. Now, silica was transferred into an oven and dried at 80° C. for 12 h; after the oven temperature was adjusted to 150° C., silica was dried for another 2 h to obtain the precipitated silica modified by the coupling agent. The following processing steps and requirements were the same as in Embodiment 1.

Embodiment 7

To a mixture of 2 L of n-propyl alcohol and 120 ml of deionized water, carbonic acid was added to obtain a solution with a pH value of 5.5, and then 3.6 g of vinyltrimethoxysilane was added into the solution. The mixed solution was then allowed to stand for 6 h until a clear and transparent solution was formed. 7.2 g of precipitated silica was weighed and added into the solution to obtain another mixture. The mixture was under a shear dispersion process using a shearing machine and at a shear rate of 1000 rpm for 30 min/time, and the procedure was repeated for 20 times to obtain a turbid solution. The turbid solution was stirred at a constant rate of greater than 30 r/min to lower the temperature to room temperature after each shear dispersion process to avoid precipitation of silica. After the turbid solution was stirred for 10 min and its temperature was lowered to room temperature, the next shear dispersion process was performed. The turbid solution treated by the shear dispersion process was transferred into a fume chamber and continuously stirred at a stirring rate of 300 r/min, after stirred for 168 h, the solution evaporated to a constant weight, and viscous and preliminarily surface-treated silica was obtained. Now, silica was transferred into an oven and dried at 80° C. for 24 h; after the oven temperature was adjusted to 150° C., silica was dried for another 2 h to obtain the precipitated silica modified by the coupling agent. The following processing steps and requirements were the same as in Embodiment 1.

Embodiment 8

To a mixture of 2 L of isopropyl alcohol and 120 ml of deionized water, perchloric acid was added to obtain a solution with a pH value of 3, and then 3.6 g of γ-glycidyloxypropyltrimethoxysilane was added into the solution. The mixed solution was then allowed to stand for 4 h until a clear and transparent solution was formed. 3.6 kg of precipitated silica was weighed and added into the solution to obtain a mixture. The mixture was dispersed by a blender to obtain a turbid solution with a frequency of 30 min/time for 8 times, that was 4 h. After every stirring dispersion process, the lid of the blender was opened for ventilation for 30 min, through which the temperature of the turbid solution was reduced to room temperature. Then the turbid solution treated by the stirring dispersion process was transferred into a fume chamber and continuously stirred at a stirring rate of 30 r/min for 24 h and the solvents evaporated to a constant weight to obtain viscous and preliminarily surface-treated silica. Now, silica was transferred into an oven and dried at 80° C. for 12 h; after the oven temperature was adjusted to 150° C., silica was dried for another 2 h to obtain the precipitated silica modified by the coupling agent. The following processing steps and requirements were the same as in Embodiment 1.

Embodiment 9

To a mixture of 2 L of ethylene glycol and 120 ml of deionized water, nitric acid was added to obtain a solution with a pH value of 5, and then 24 g of dimethyldichlorosilane was added into the solution. The mixed solution was then allowed to stand for 6 h until a clear and transparent solution was formed. 300 g of precipitated silica was weighed and added into the solution to obtain another mixture. The mixture was under a shear dispersion process using a shearing machine and at a shear rate of 5000 rpm for 30 min/time, and the procedure was repeated for 20 times to obtain a turbid solution. The turbid solution was stirred at a constant rate of greater than 30 r/min to lower the temperature to room temperature after each shear dispersion process to avoid precipitation of silica. After the turbid solution was stirred for 10 min and its temperature was lowered to room temperature, the next shear dispersion process was performed. The turbid solution treated by the shear dispersion process was transferred into a fume chamber and continuously stirred at a stirring rate of 300 r/min, after stirred for 72 h, the solution substantially evaporated to dryness, and viscous and preliminarily surface-treated silica was obtained. Now, silica was transferred into an oven and dried at 80° C. for 24 h; after the oven temperature was adjusted to 150° C., silica was dried for another 2 h to obtain the precipitated silica modified by the coupling agent. The following processing steps and requirements were the same as in Embodiment 1.

Embodiment 10

To a mixture of 2 L of propylene glycol and 120 ml of deionized water, nitrous acid was added to obtain a solution with a pH value of 5, and then 360 g of trimethylethoxysilane was added into the solution. The mixed solution was then allowed to stand for 40 h until a clear and transparent solution was formed. 20 kg of precipitated silica was weighed and added into the solution to obtain a mixture. The mixture was dispersed by a blender to obtain a turbid solution with a frequency of 1 h/time for 8 times, that was 8 h. After every stirring dispersion process, the lid of the blender was opened for ventilation for 60 min, through which the temperature of the turbid solution was reduced to room temperature. Then the turbid solution treated by the stirring dispersion process was transferred into a fume chamber and continuously stirred at a stirring rate of 30 r/min to obtain a solution, after stirred for 24 h, the solution evaporated to a constant weight, and viscous and preliminarily surface-treated silica was obtained. Now, silica was transferred into an oven and dried at 80° C. for 12 h; after the oven temperature was adjusted to 150° C., silica was dried for another 2 h to obtain the precipitated silica modified by the coupling agent. The following processing steps and requirements were the same as in Embodiment 1.

Embodiment 11

To a mixture of 1 L of dimethylformamide and 1 L of deionized water, acetic acid was added to obtain a solution with a pH value of 4, and then 30 g of polydimethylsiloxane was added into the solution. The mixed solution was then allowed to stand for 8 h until a clear and transparent solution was formed. 60 g of precipitated silica was weighed and added into the solution to obtain another mixture. The mixture was under a shear dispersion process using a shearing machine and at a shear rate of 2000 rpm for 30 min/time, and the procedure was repeated for 5 times to obtain a turbid solution. The turbid solution was stirred at a constant rate of greater than 30 r/min to lower the temperature to room temperature after each shear dispersion process to avoid precipitation of silica. After the turbid solution was stirred for 10 min and its temperature was lowered to room temperature, the next shear dispersion process was performed. The turbid solution treated by the shear dispersion process was transferred into a fume chamber and continuously stirred at a stirring rate of 300 r/min, after stirred for 100 h, the solution substantially evaporated to dryness, and viscous and preliminarily surface-treated silica was obtained. Now, silica was transferred into an oven and dried at 80° C. for 48 h; after the oven temperature was adjusted to 150° C., silica was dried for another 2 h to obtain the precipitated silica modified by the coupling agent. The following processing steps and requirements were the same as in Embodiment 1.

Embodiment 12

To a mixture of 1 L of dimethyl sulfoxide and 1 L of deionized water, hydrogen cyanide was added to obtain a solution with a pH value of 4, and then 30 g Hexamethyldisiloxane was added into the solution. The mixed solution was then allowed to stand for 8 h until a clear and transparent solution was formed. 3 kg precipitated silica was weighed and added into the solution to obtain another mixture. The mixture was dispersed by a blender to obtain a turbid solution with a frequency of 1 h/time for 8 times, that was 8 h. After every stirring dispersion process, the lid of the blender was opened for ventilation for 60 min, through which the temperature of the turbid solution was reduced to room temperature. Then the turbid solution treated by the stirring dispersion process was transferred into a fume chamber and continuously stirred at a stirring rate of 30 r/min to obtain a solution. The solution was stirred for 24 h and the solvents evaporated to a constant weight to obtain viscous and preliminarily surface-treated silica. Now, silica was transferred into an oven and dried at 80° C. for 12 h; after the oven temperature was adjusted to 150° C., silica was dried for another 2 h to obtain the precipitated silica modified by the coupling agent. The following processing steps and requirements were the same as in Example 1.

Embodiment 13

To a mixture of 1 L of anhydrous ethanol and 1 L of deionized water, hexanedioic acid was ad ded to obtain a solution with a pH value of 2, and then 300 g octamethyltrisiloxane was added into the solution. The mixed solution was then allowed to stand for 40 h until a clear and transparent solution was formed. 20 kg precipitated silica was weighed and added into the solution to obtain another mixture. The mixture was dispersed by a blender to obtain a turbid solution with a frequency of 1 h/time for 8 times, that was 8 h. After every stirring dispersion process, the lid of the blender was opened for ventilation for 60 min, through which the temperature of the turbid solution was reduced to room temperature. Then the turbid solution treated by the stirring dispersion process was transferred into a fume chamber and continuously stirred at a stirring rate of 30 r/min to obtain a solution. The solution was stirred for 24 h and the solvents evaporated to a constant weight to obtain viscous and preliminarily surface-treated silica. Now, silica was transferred into an oven and dried at 80° C. for 12 h; after the oven temperature was adjusted to 150° C., silica was dried for another 2 h to obtain the precipitated silica modified by the coupling agent. The following processing steps and requirements were the same as in Example 1.

Embodiment 14

To a mixture of 1 L of anhydrous ethanol and 1 ml of deionized water, hydrochloric acid was added to obtain a solution with a pH value of 6, and then 0.03 g of silazane was added into the solution. The mixed solution was then allowed to stand for 2 h until a clear and transparent solution was formed. 300 g of fumed silica was weighed and added into the solution under slow stirring at a stirring rate of 100 r/min to avoid the increase of the solution viscosity. The mixed solution of the coupling agent sol and silica was dispersed under ultrasonic wave at an ultrasonic frequency of over 20 kHz at 30 min/time for 10 times. After each ultrasonic dispersion process, the turbid solution was stirred at 300 r/min for 1 h to lower the temperature to room temperature, and then the next ultrasonic dispersion process was performed. The turbid solution treated by the ultrasonic dispersion process was transferred into a fume chamber and continuously stirred at a stirring rate of 300 r/min. After stirred for 30 h, the solution substantially evaporated to dryness, and viscous and preliminarily surface-treated white carbon was obtained, which was a light blue and semitransparent solid. Now, silica was transferred into an oven and dried at 80° C. for 6 h; after the oven temperature was adjusted to 150° C., silica was dried for another 2 h to obtain fumed silica modified by the coupling agent. The following processing steps and requirements were the same as in Embodiment 1.

Embodiment 15

To a mixture of 1 L of anhydrous ethanol and 1 ml of deionized water, hydrofluoric acid was added to obtain a solution with a pH value of 6, and then 0.03 g of silazane was added into the solution. The mixed solution was then allowed to stand for 2 h until a clear and transparent solution was formed. 0.3 g of fumed silica was weighed and added into the solution under slow stirring at a stirring rate of 100 r/min to avoid the increase of the solution viscosity. The mixed solution of the coupling agent sol and silica was dispersed under ultrasonic wave at an ultrasonic frequency of over 20 kHz at 30 min/time for 5 times. After each ultrasonic dispersion process, the turbid solution was stirred at 300 r/min for 1 h to lower the temperature to room temperature, and then the next ultrasonic dispersion process was performed. The turbid solution treated by the ultrasonic dispersion process was transferred into a fume chamber and continuously stirred at a stirring rate of 300 r/min. After stirred for 100 h, the solution substantially evaporated to dryness, and viscous and preliminarily surface-treated white carbon was obtained, which was a light blue and semitransparent solid. Now, silica was transferred into an oven and dried at 80° C. for 6 h; after the oven temperature was adjusted to 150° C., silica was dried for another 2 h to obtain fumed silica modified by the coupling agent. The following processing steps and requirements were the same as in Embodiment 1.

Embodiment 16

To a mixture of 1 L of methyl alcohol and 1 ml of deionized water, sulphuric acid was added to obtain a solution with a pH value of 1, and then 30 g of tetrabutoxysilane was added into the solution. The mixed solution was then allowed to stand for 6 h until a clear and transparent solution was formed. 300 g of fumed silica was weighed and added into the solution under slow stirring at a stirring rate of 100 r/min to avoid the increase of the solution viscosity. The mixed solution of the coupling agent sol and silica was dispersed under ultrasonic wave at an ultrasonic frequency of over 20 kHz at 30 min/time for 10 times. After each ultrasonic dispersion process, the turbid solution was stirred at 300 r/min for 1 h to lower the temperature to room temperature, and then the next ultrasonic dispersion process was performed. The turbid solution treated by the ultrasonic dispersion process was transferred into a fume chamber and continuously stirred at a stirring rate of 300 r/min, after stirred for 24 h, the solution evaporated to a constant weight, and viscous and preliminarily surface-treated white carbon was obtained, which was a light blue and semitransparent solid. Now, silica was transferred into an oven and dried at 80° C. for 6 h; after the oven temperature was adjusted to 150° C., silica was dried for another 2 h to obtain fumed silica modified by the coupling agent. The following processing steps and requirements were the same as in Embodiment 1.

Embodiment 17

To a mixture of 1 L of acetone and 1 ml of deionized water, sulfurous acid was added to obtain a solution with a pH value of 1, and then 300 g of tetradecamethyltetrasiloxane was added into the solution. The mixed solution was then allowed to stand for 40 h until a clear and transparent solution was formed. 600 g of fumed silica was weighed and added into the solution under slow stirring at a stirring rate of 100 r/min to avoid the increase of the solution viscosity. The mixed solution of the coupling agent sol and silica was dispersed under ultrasonic wave at an ultrasonic frequency of over 20 kHz at 1 h/time for 30 times. After each ultrasonic dispersion process, the turbid solution was stirred at 300 r/min for 1 h to lower the temperature to room temperature, and then the next ultrasonic dispersion process was performed. The turbid solution treated by the ultrasonic dispersion process was transferred into a fume chamber and continuously stirred at a stirring rate of 300 r/min, after stirred for 24 h, the solution substantially evaporated to dryness, and viscous and preliminarily surface-treated white carbon was obtained, which was a light blue and semitransparent solid. Now, silica was transferred into an oven and dried at 80° C. for 6 h; after the oven temperature was adjusted to 150° C., silica was dried for another 2 h to obtain fumed silica modified by the coupling agent. The following processing steps and requirements were the same as in Embodiment 1.

Embodiment 18

To a mixture of 1 L of n-propyl alcohol and 1 ml of deionized water, carbonic acid was added to obtain a solution with a pH value of 1, and then 300 g of 1,3,5,7-tetramethyl-1,3,5,7-tetravinylcyclotetrasiloxane was added into the solution. The mixed solution was then allowed to stand for 40 h until a clear and transparent solution was formed. 1000 g of fumed silica was weighed and added into the solution under slow stirring at a stirring rate of 100 r/min to avoid the increase of the solution viscosity. The mixed solution of the coupling agent sol and silica was dispersed under ultrasonic wave at an ultrasonic frequency of over 20 kHz at 1 h/time for 50 times. After each ultrasonic dispersion process, the turbid solution was stirred at 300 r/min for 1 h to lower the temperature to room temperature, and then the next ultrasonic dispersion process was performed. The turbid solution treated by the ultrasonic dispersion process was transferred into a fume chamber and continuously stirred at a stirring rate of 300 r/min. After stirred for 24 h, the solution substantially evaporated to dryness, and viscous and preliminarily surface-treated white carbon was obtained, which was a light blue and semitransparent solid. Now, silica was transferred into an oven and dried at 80° C. for 6 h; after the oven temperature was adjusted to 150° C., silica was dried for another 2 h to obtain fumed silica modified by the coupling agent. The following processing steps and requirements were the same as in Embodiment 1.

Embodiment 19

To a mixture of 1 L of isopropyl alcohol and 1 ml of deionized water, perchloric acid was added to obtain a solution with a pH value of 3, and then 0.1 g of 1,3,5,7-tetramethyl-1,3,5,7-tetrahydrocyclotetrasiloxane was added into the solution. The mixed solution was then allowed to stand for 8 h until a clear and transparent solution was formed. 1000 g of fumed silica was weighed and added into the solution under slow stirring at a stirring rate of 100 r/min to avoid the increase of the solution viscosity. The mixed solution of the coupling agent sol and silica was dispersed under ultrasonic wave at an ultrasonic frequency of over 20 kHz at 1 h/time for 50 times. After each ultrasonic dispersion process, the turbid solution was stirred at 300 r/min for 1 h to lower the temperature to room temperature, and then the next ultrasonic dispersion process was performed. The turbid solution treated by the ultrasonic dispersion process was transferred into a fume chamber and continuously stirred at a stirring rate of 300 r/min. After stirred for 24 h, the solution substantially evaporated to dryness, and viscous and preliminarily surface-treated white carbon was obtained, which was a light blue and semitransparent solid. Now, silica was transferred into an oven and dried at 80° C. for 6 h; after the oven temperature was adjusted to 150° C., silica was dried for another 2 h to obtain fumed silica modified by the coupling agent. The following processing steps and requirements were the same as in Embodiment 1.

Embodiment 20

To a mixture of 2 L of isopropyl alcohol and 120 ml of deionized water, nitric acid was added to obtain a solution with a pH value of 2, and then 1.5 g of hexamethylcyclotrisiloxane was added into the solution. The mixed solution was then allowed to stand for 4 h until a clear and transparent solution was formed. 3 g of fumed silica was weighed and added into the solution under slow stirring at a stirring rate of 100 r/min to avoid the increase of the solution viscosity. The mixed solution of the coupling agent sol and silica was dispersed under ultrasonic wave at an ultrasonic frequency of over 20 kHz at 30 min/time for 10 times. After each ultrasonic dispersion process, the turbid solution was stirred at 300 r/min for 1 h to lower the temperature to room temperature, and then the next ultrasonic dispersion process was performed. The turbid solution treated by the ultrasonic dispersion process was transferred into a fume chamber and continuously stirred at a stirring rate of 300 r/min. After stirred for 72 h, the solution substantially evaporated to dryness, and viscous and preliminarily surface-treated white carbon was obtained, which was a light blue and semitransparent solid. Now, silica was transferred into an oven and dried at 80° C. for 6 h; after the oven temperature was adjusted to 150° C., silica was dried for another 2 h to obtain fumed silica modified by the coupling agent. The following processing steps and requirements were the same as in Embodiment 1.

Embodiment 21

To a mixture of 2 L of ethylene glycol and 120 ml of deionized water, nitrous acid was added to obtain a solution with a pH value of 3, and then 1.5 g of octamethylcyclosiloxane was added into the solution. The mixed solution was then allowed to stand for 4 h until a clear and transparent solution was formed. 1500 g of fumed silica was weighed and added into the solution under slow stirring at a stirring rate of 100 r/min to avoid the increase of the solution viscosity. The mixed solution of the coupling agent sol and silica was dispersed under ultrasonic wave at an ultrasonic frequency of over 20 kHz at 1 h/time for 50 times. After each ultrasonic dispersion process, the turbid solution was stirred at 300 r/min for 1 h to lower the temperature to room temperature, and then the next ultrasonic dispersion process was performed. The turbid solution treated by the ultrasonic dispersion process was transferred into a fume chamber and continuously stirred at a stirring rate of 300 r/min. After stirred for 24 h, the solution substantially evaporated to dryness, and viscous and preliminarily surface-treated white carbon was obtained, which was a light blue and semitransparent solid. Now, silica was transferred into an oven and dried at 80° C. for 6 h; after the oven temperature was adjusted to 150° C., silica was dried for another 2 h to obtain fumed silica modified by the coupling agent. The following processing steps and requirements were the same as in Embodiment 1.

Embodiment 22

To a mixture of 2 L of anhydrous ethanol and 120 ml of deionized water, salt was added to obtain a solution with a pH value of 6, and then 500 g of silazane was added into the solution. The mixed solution was then allowed to stand for 48 h until a clear and transparent solution was formed. 1000 g of fumed silica was weighed and added into the solution under slow stirring at a stirring rate of 100 r/min to avoid the increase of the solution viscosity. The mixed solution of the coupling agent sol and silica was dispersed under ultrasonic wave at an ultrasonic frequency of over 20 kHz at 1 h/time for 80 times. After each ultrasonic dispersion process, the turbid solution was stirred at 300 r/min for 1 h to lower the temperature to room temperature, and then the next ultrasonic dispersion process was performed. The turbid solution treated by the ultrasonic dispersion process was transferred into a fume chamber and continuously stirred at a stirring rate of 300 r/min. After stirred for 24 h, the solution substantially evaporated to dryness, and viscous and preliminarily surface-treated white carbon was obtained, which was a light blue and semitransparent solid. Now, silica was transferred into an oven and dried at 80° C. for 8 h; after the oven temperature was adjusted to 150° C., silica was dried for another 2 h to obtain fumed silica modified by the coupling agent. The following processing steps and requirements were the same as in Embodiment 1.

Embodiment 23

To a mixture of 1 L of dimethyl sulfoxide and 1 L of deionized water, acetic acid was added to obtain a solution with a pH value of 5, and then 8 g of methyltrimethoxysilane was added into the solution. The mixed solution was then allowed to stand for 2 h until a clear and transparent solution was formed. 16 g of fumed silica was weighed and added into the solution under slow stirring at a stirring rate of 100 r/min to avoid the increase of the solution viscosity. The mixed solution of the coupling agent sol and silica was dispersed under ultrasonic wave at an ultrasonic frequency of over 20 kHz at 30 min/time for 10 times. After each ultrasonic dispersion process, the turbid solution was stirred at 300 r/min for 1 h to lower the temperature to room temperature, and then the next ultrasonic dispersion process was performed. The turbid solution treated by the ultrasonic dispersion process was transferred into a fume chamber and continuously stirred at a stirring rate of 300 r/min. After stirred for 100 h, the solution substantially evaporated to a constant weight, and viscous and preliminarily surface-treated white carbon was obtained, which was a light blue and semitransparent solid. Now, silica was transferred into an oven and dried at 80° C. for 6 h; after the oven temperature was adjusted to 150° C., silica was dried for another 2 h to obtain fumed silica modified by the coupling agent. The following processing steps and requirements were the same as in Embodiment 1.

Embodiment 24

To a mixture of 1 L of anhydrous ethanol and 1 L of deionized water, hydrochloric acid was added to obtain a solution with a pH value of 2, and then 8 g of vinyltriethoxysilane was added into the solution. The mixed solution was then allowed to stand for 2 h until a clear and transparent solution was formed. 2000 g of fumed silica was weighed and added into the solution under slow stirring at a stirring rate of 100 r/min to avoid the increase of the solution viscosity. The mixed solution of the coupling agent sol and silica was dispersed under ultrasonic wave at an ultrasonic frequency of over 20 kHz at 1 h/time for 50 times. After each ultrasonic dispersion process, the turbid solution was stirred at 300 r/min for 1 h to lower the temperature to room temperature, and then the next ultrasonic dispersion process was performed. The turbid solution treated by the ultrasonic dispersion process was transferred into a fume chamber and continuously stirred at a stirring rate of 300 r/min. After stirred for 24 h, the solution substantially evaporated to dryness, and viscous and preliminarily surface-treated white carbon was obtained, which was a light blue and semitransparent solid. Now, silica was transferred into an oven and dried at 80° C. for 6 h; after the oven temperature was adjusted to 150° C., silica was dried for another 2 h to obtain fumed silica modified by the coupling agent. The following processing steps and requirements were the same as in Embodiment 1.

Embodiment 25

To a mixture of 1 L of anhydrous ethanol and 1 L of deionized water, hydrochloric acid was added to obtain a solution with a pH value of 1, and then 300 g of hexamethyldisilazane was added into the solution. The mixed solution was then allowed to stand for 48 h until a clear and transparent solution was formed. 2000 g of fumed silica was weighed and added into the solution under slow stirring at a stirring rate of 100 r/min to avoid the increase of the solution viscosity. The mixed solution of the coupling agent sol and silica was dispersed under ultrasonic wave at an ultrasonic frequency of over 20 kHz at 1 h/time for 50 times. After each ultrasonic dispersion process, the turbid solution was stirred at 300 r/min for 1 h to lower the temperature to room temperature, and then the next ultrasonic dispersion process was performed. The turbid solution treated by the ultrasonic dispersion process was transferred into a fume chamber and continuously stirred at a stirring rate of 300 r/min. After stirred for 24 h, the solution substantially evaporated to dryness, and viscous and preliminarily surface-treated white carbon was obtained, which was a light blue and semitransparent solid. Now, silica was transferred into an oven and dried at 80° C. for 6 h; after the oven temperature was adjusted to 150° C., silica was dried for another 2 h to obtain fumed silica modified by the coupling agent. The following processing steps and requirements were the same as in Embodiment 1.

Embodiment 26

To a mixture of 1 L of anhydrous ethanol and 1 ml of deionized water, ammonia water was added to obtain a solution with a pH value of 14, and then 0.03 g of N-(β-aminoethyl)-γ-aminopropylmethylbimethoxysilane was added into the solution. The mixed solution was then allowed to stand for 2 h until a clear and transparent solution was formed. 300 g of precipitated silica was weighed and added into the solution to obtain another mixture. The mixture was under a shear dispersion process using a shearing machine and at a shear rate of 3000 rpm for 30 min/time, and the procedure was repeated for 5 times to obtain a turbid solution. The turbid solution was stirred at a constant rate of greater than 30 r/min to lower the temperature to room temperature after each shear dispersion process to avoid precipitation of silica. After the turbid solution was stirred for 10 min and its temperature was lowered to room temperature, the next shear dispersion process was performed. The turbid solution treated by the shear dispersion process was transferred into a fume chamber and continuously stirred at a stirring rate of 300 r/min, after stirred for 72 h, the solution substantially evaporated to dryness, and viscous and preliminarily surface-treated silica was obtained. Now, silica was transferred into an oven and dried at 80° C. for 6 h; after the oven temperature was adjusted to 150° C., silica was dried for another 2 h to obtain the precipitated silica modified by the coupling agent. The following processing steps and requirements were the same as in Embodiment 1.

Embodiment 27

To a mixture of 1 L of anhydrous ethanol and 1 ml of deionized water, sodium oxide was added to obtain a solution with a pH value of 14, and then 0.03 g of N-(β-aminoethyl)-γ-aminopropylmethylbimethoxysilane was added into the solution. The mixed solution was then allowed to stand for 2 h until a clear and transparent solution was formed. 0.3 g of precipitated silica was weighed and added into the solution to obtain another mixture. The mixture was under a shear dispersion process using a shearing machine and at a shear rate of 1000 rpm for 30 min/time, and the procedure was repeated for 5 times to obtain a turbid solution. The turbid solution was stirred at a constant rate of greater than 30 r/min to lower the temperature to room temperature after each shear dispersion process to avoid precipitation of silica. After the turbid solution was stirred for 10 min and its temperature was lowered to room temperature, the next shear dispersion process was performed. The turbid solution treated by the shear dispersion process was transferred into a fume chamber and continuously stirred at a stirring rate of 300 r/min, after stirred for 168 h, the solution substantially evaporated to a constant weight, and viscous and preliminarily surface-treated silica was obtained. Now, silica was transferred into an oven and dried at 80° C. for 6 h; after the oven temperature was adjusted to 150° C., silica was dried for another 2 h to obtain the precipitated silica modified by the coupling agent. The following processing steps and requirements were the same as in Embodiment 1.

Embodiment 28

To a mixture of 1 L of Acetone and 1 ml of deionized water, magnesium oxide was added to obtain a solution with a pH value of 14, and then 30 g of N-(β-aminoethyl)-γ-aminopropylmethylbimethoxysilane was added into the solution. The mixed solution was then allowed to stand for 12 h until a clear and transparent solution was formed. 300 g of precipitated silica was weighed and added into the solution to obtain another mixture. The mixture was under a shear dispersion process using a shearing machine and at a shear rate of 3000 rpm for 30 min/time, and the procedure was repeated for 15 times to obtain a turbid solution. The turbid solution was stirred at a constant rate of greater than 30 r/min to lower the temperature to room temperature after each shear dispersion process to avoid precipitation of silica. After the turbid solution was stirred for 10 min and its temperature was lowered to room temperature, the next shear dispersion process was performed. The turbid solution treated by the shear dispersion process was transferred into a fume chamber and continuously stirred at a stirring rate of 300 r/min, b, after stirred for 72 h, the solution substantially evaporated to dryness, and viscous and preliminarily surface-treated silica was obtained. Now, silica was transferred into an oven and dried at 80° C. for 6 h; after the oven temperature was adjusted to 150° C., silica was dried for another 2 h to obtain the precipitated silica modified by the coupling agent. The following processing steps and requirements were the same as in Embodiment 1.

Embodiment 29

To a mixture of 1 L of methyl alcohol and 1 ml of deionized water, potassium oxide was added to obtain a solution with a pH value of 12, and then 300 g of γ-aminopropyltriethoxysilane was added into the solution. The mixed solution was then allowed to stand for 18 h until a clear and transparent solution was formed. 4 kg of precipitated silica was weighed and added into the solution to obtain another mixture. The mixture was dispersed by a blender to obtain a turbid solution with a frequency of 30 min/time for 6 times, that was 3 h. After every stirring dispersion process, the lid of the blender was opened for ventilation for 30 min, through which the temperature of the turbid solution was reduced to room temperature. Then the turbid solution treated by the stirring dispersion process was transferred into a fume chamber and continuously stirred at a stirring rate of 30 r/min to obtain a solution. The solution was stirred for 24 h and the solvents evaporated to a constant weight to obtain viscous and preliminarily surface-treated silica. Now, silica was transferred into an oven and dried at 80° C. for 12 h; after the oven temperature was adjusted to 150° C., silica was dried for another 2 h to obtain the precipitated silica modified by the coupling agent. The following processing steps and requirements were the same as in Embodiment 1.

Embodiment 30

To a mixture of 2 L of anhydrous ethanol and 120 ml of deionized water, sodium hydroxide was added to obtain a solution with a pH value of 12, and then 3.6 g of γ-aminopropyltriethoxysilane was added into the solution. The mixed solution was then allowed to stand for 6 h until a clear and transparent solution was formed. 7.2 g of precipitated silica was weighed and added into the solution to obtain another mixture. The mixture was under a shear dispersion process using a shearing machine and at a shear rate of 2000 rpm for 30 min/time, and the procedure was repeated for 20 times to obtain a turbid solution. The turbid solution was stirred at a constant rate of greater than 30 r/min to lower the temperature to room temperature after each shear dispersion process to avoid precipitation of silica. After the turbid solution was stirred for 10 min and its temperature was lowered to room temperature, the next shear dispersion process was performed. The turbid solution treated by the shear dispersion process was transferred into a fume chamber and continuously stirred at a stirring rate of 300 r/min, after stirred for 168 h, the solution evaporated to a constant weight, and viscous and preliminarily surface-treated silica was obtained. Now, silica was transferred into an oven and dried at 80° C. for 24 h; after the oven temperature was adjusted to 150° C., silica was dried for another 2 h to obtain the precipitated silica modified by the coupling agent. The following processing steps and requirements were the same as in Embodiment 1.

Embodiment 31

To a mixture of 2 L of Acetone and 120 ml of deionized water, potassium hydroxide was added to obtain a solution with a pH value of 12, and then 24 g of γ-aminopropyltriethoxysilane was added into the solution. The mixed solution was then allowed to stand for 6 h until a clear and transparent solution was formed. 300 g of precipitated silica was weighed and added into the solution to obtain another mixture. The mixture was under a shear dispersion process using a shearing machine and at a shear rate of 5000 rpm for 30 min/time, and the procedure was repeated for 20 times to obtain a turbid solution. The turbid solution was stirred at a constant rate of greater than 30 r/min to lower the temperature to room temperature after each shear dispersion process to avoid precipitation of silica. After the turbid solution was stirred for 10 min and its temperature was lowered to room temperature, the next shear dispersion process was performed. The turbid solution treated by the shear dispersion process was transferred into a fume chamber and continuously stirred at a stirring rate of 300 r/min, after stirred for 72 h, the solution substantially evaporated to dryness, and viscous and preliminarily surface-treated silica was obtained. Now, silica was transferred into an oven and dried at 80° C. for 24 h; after the oven temperature was adjusted to 150° C., silica was dried for another 2 h to obtain the precipitated silica modified by the coupling agent. The following processing steps and requirements were the same as in Embodiment 1.

Embodiment 32

To a mixture of 2 L of anhydrous ethanol and 120 ml of deionized water, magnesium hydroxide was added to obtain a solution with a pH value of 14, and then 360 g of γ-aminopropyltriethoxysilane was added into the solution. The mixed solution was then allowed to stand for 40 h until a clear and transparent solution was formed. 720 g of precipitated silica was weighed and added into the solution to obtain another mixture. The mixture was under a shear dispersion process using a shearing machine and at a shear rate of 5000 rpm for 30 min/time, and the procedure was repeated for 20 times to obtain a turbid solution. The turbid solution was stirred at a constant rate of greater than 30 r/min to lower the temperature to room temperature after each shear dispersion process to avoid precipitation of silica. After the turbid solution was stirred for 10 min and its temperature was lowered to room temperature, the next shear dispersion process was performed. The turbid solution treated by the shear dispersion process was transferred into a fume chamber and continuously stirred at a stirring rate of 300 r/min, after stirred for 72 h, the solution substantially evaporated to dryness, and viscous and preliminarily surface-treated silica was obtained. Now, silica was transferred into an oven and dried at 80° C. for 24 h; after the oven temperature was adjusted to 150° C., silica was dried for another 2 h to obtain the precipitated silica modified by the coupling agent. The following processing steps and requirements were the same as in Embodiment 1.

Embodiment 33

To a mixture of 2 L of Acetone and 120 ml of deionized water, calcium hydroxide was added to obtain a solution with a pH value of 14, and then 360 g of γ-aminopropyltriethoxysilane was added into the solution. The mixed solution was then allowed to stand for 40 h until a clear and transparent solution was formed. 20 kg of precipitated silica was weighed and added into the solution to obtain a mixture. The mixture was dispersed by a blender to obtain a turbid solution with a frequency of 1 h/time for 8 times, that was 8 h. After every stirring dispersion process, the lid of the blender was opened for ventilation for 60 min, through which the temperature of the turbid solution was reduced to room temperature. Then the turbid solution treated by the stirring dispersion process was transferred into a fume chamber and continuously stirred at a stirring rate of 30 r/min to obtain a solution. The solution was stirred for 24 h and the solvents evaporated to a constant weight to obtain viscous and preliminarily surface-treated silica. Now, silica was transferred into an oven and dried at 80° C. for 12 h; after the oven temperature was adjusted to 150° C., silica was dried for another 2 h to obtain the precipitated silica modified by the coupling agent. The following processing steps and requirements were the same as in Embodiment 1.

Embodiment 34

To a mixture of 1 L of anhydrous ethanol and 1 L of deionized water, aluminium hydroxide was added to obtain a solution with a pH value of 12, and then 30 g of γ-aminopropyltriethoxysilane was added into the solution. The mixed solution was then allowed to stand for 8 h until a clear and transparent solution was formed. 60 g of precipitated silica was weighed and added into the solution to obtain another mixture. The mixture was under a shear dispersion process using a shearing machine and at a shear rate of 1000 rpm for 30 min/time, and the procedure was repeated for 5 times to obtain a turbid solution. The turbid solution was stirred at a constant rate of greater than 30 r/min to lower the temperature to room temperature after each shear dispersion process to avoid precipitation of silica. After the turbid solution was stirred for 10 min and its temperature was lowered to room temperature, the next shear dispersion process was performed. The turbid solution treated by the shear dispersion process was transferred into a fume chamber and continuously stirred at a stirring rate of 300 r/min, after stirred for 100 h, the solution substantially evaporated to dryness, and viscous and preliminarily surface-treated silica was obtained. Now, silica was transferred into an oven and dried at 80° C. for 48 h; after the oven temperature was adjusted to 150° C., silica was dried for another 2 h to obtain the precipitated silica modified by the coupling agent. The following processing steps and requirements were the same as in Embodiment 1.

Embodiment 35

To a mixture of 1 L of acetone and 1 L of deionized water, barium hydroxide was added to obtain a solution with a pH value of 12, and then 30 g of γ-aminopropyltriethoxysilane was added into the solution. The mixed solution was then allowed to stand for 8 h until a clear and transparent solution was formed. 3 kg of precipitated silica was weighed and added into the solution to obtain a mixture. The mixture was dispersed by a blender to obtain a turbid solution with a frequency of 1 h/time for 8 times, that was 8 h. After every stirring dispersion process, the lid of the blender was opened for ventilation for 60 min, through which the temperature of the turbid solution was reduced to room temperature. Then the turbid solution treated by the stirring dispersion process was transferred into a fume chamber and continuously stirred at a stirring rate of 30 r/min to obtain a solution. The solution was stirred for 24 h and the solvents evaporated to a constant weight to obtain viscous and preliminarily surface-treated silica. Now, silica was transferred into an oven and dried at 80° C. for 12 h; after the oven temperature was adjusted to 150° C., silica was dried for another 2 h to obtain the precipitated silica modified by the coupling agent. The following processing steps and requirements were the same as in Embodiment 1.

Embodiment 36

To a mixture of 1 L of anhydrous ethanol and 1 L of deionized water, sodium carbonate was added to obtain a solution with a pH value of 14, and then 300 g of γ-aminopropyltriethoxysilane was added into the solution. The mixed solution was then allowed to stand for 40 h until a clear and transparent solution was formed. 20 kg of precipitated silica was weighed and added into the solution to obtain a mixture. The mixture was dispersed by a blender to obtain a turbid solution with a frequency of 1 h/time for 8 times, that was 8 h. After every stirring dispersion process, the lid of the blender was opened for ventilation for 60 min, through which the temperature of the turbid solution was reduced to room temperature. Then the turbid solution treated by the stirring dispersion process was transferred into a fume chamber and continuously stirred at a stirring rate of 30 r/min to obtain a solution. The solution was stirred for 24 h and the solvents evaporated to a constant weight to obtain viscous and preliminarily surface-treated silica. Now, silica was transferred into an oven and dried at 80° C. for 12 h; after the oven temperature was adjusted to 150° C., silica was dried for another 2 h to obtain the precipitated silica modified by the coupling agent. The following processing steps and requirements were the same as in Embodiment 1.

Embodiment 37

To a mixture of 1 L of Acetone and 1 ml of deionized water, sodium bicarbonate was added to obtain a solution with a pH value of 10, and then 0.03 g of γ-aminopropyltriethoxysilane was added into the solution. The mixed solution was then allowed to stand for 2 h until a clear and transparent solution was formed. 300 g of fumed silica was weighed and added into the solution under slow stirring at a stirring rate of 100 r/min to avoid the increase of the solution viscosity. The mixed solution of the coupling agent sol and silica was dispersed under ultrasonic wave at an ultrasonic frequency of over 20 kHz at 30 min/time for 10 times. After each ultrasonic dispersion process, the turbid solution was stirred at 300 r/min for 1 h to lower the temperature to room temperature, and then the next ultrasonic dispersion process was performed. The turbid solution treated by the ultrasonic dispersion process was transferred into a fume chamber and continuously stirred at a stirring rate of 300 r/min. After stirred for 30 h, the solution substantially evaporated to dryness, and viscous and preliminarily surface-treated white carbon was obtained, which was a light blue and semitransparent solid. Now, silica was transferred into an oven and dried at 80° C. for 6 h; after the oven temperature was adjusted to 150° C., silica was dried for another 2 h to obtain fumed silica modified by the coupling agent. The following processing steps and requirements were the same as in Embodiment 1.

Embodiment 38

To a mixture of 1 L of anhydrous ethanol and 1 ml of deionized water, ammonium carbonate was added to obtain a solution with a pH value of 10, and then 0.03 g of γ-aminopropyltriethoxysilane was added into the solution. The mixed solution was then allowed to stand for 2 h until a clear and transparent solution was formed. 0.3 g of fumed silica was weighed and added into the solution under slow stirring at a stirring rate of 100 r/min to avoid the increase of the solution viscosity. The mixed solution of the coupling agent sol and silica was dispersed under ultrasonic wave at an ultrasonic frequency of over 20 kHz at 30 min/time for 5 times. After each ultrasonic dispersion process, the turbid solution was stirred at 300 r/min for 1 h to lower the temperature to room temperature, and then the next ultrasonic dispersion process was performed. The turbid solution treated by the ultrasonic dispersion process was transferred into a fume chamber and continuously stirred at a stirring rate of 300 r/min. After stirred for 100 h, the solution substantially evaporated to dryness, and viscous and preliminarily surface-treated white carbon was obtained, which was a light blue and semitransparent solid. Now, silica was transferred into an oven and dried at 80° C. for 6 h; after the oven temperature was adjusted to 150° C., silica was dried for another 2 h to obtain fumed silica modified by the coupling agent. The following processing steps and requirements were the same as in Embodiment 1.

Embodiment 39

To a mixture of 1 L of anhydrous ethanol and 1 ml of deionized water, ammonium bicarbonate was added to obtain a solution with a pH value of 14, and then 30 g of γ-aminopropyltriethoxysilane was added into the solution. The mixed solution was then allowed to stand for 6 h until a clear and transparent solution was formed. 300 g of fumed silica was weighed and added into the solution under slow stirring at a stirring rate of 100 r/min to avoid the increase of the solution viscosity. The mixed solution of the coupling agent sol and silica was dispersed under ultrasonic wave at an ultrasonic frequency of over 20 kHz at 30 min/time for 10 times. After each ultrasonic dispersion process, the turbid solution was stirred at 300 r/min for 1 h to lower the temperature to room temperature, and then the next ultrasonic dispersion process was performed. The turbid solution treated by the ultrasonic dispersion process was transferred into a fume chamber and continuously stirred at a stirring rate of 300 r/min. After stirred for 24 h, the solution substantially evaporated to a constant weight, and viscous and preliminarily surface-treated white carbon was obtained, which was a light blue and semitransparent solid. Now, silica was transferred into an oven and dried at 80° C. for 6 h; after the oven temperature was adjusted to 150° C., silica was dried for another 2 h to obtain fumed silica modified by the coupling agent. The following processing steps and requirements were the same as in Embodiment 1.

Embodiment 40

To a mixture of 1 L of anhydrous ethanol and 1 ml of deionized water, calcium carbonate was added to obtain a solution with a pH value of 10, and then 300 g of N-(β-amino ethyl)-γ-aminopropylmethylbimethoxysilane was added into the solution. The mixed solution was then allowed to stand for 40 h until a clear and transparent solution was formed. 1000 g of fumed silica was weighed and added into the solution under slow stirring at a stirring rate of 100 r/min to avoid the increase of the solution viscosity. The mixed solution of the coupling agent sol and silica was dispersed under ultrasonic wave at an ultrasonic frequency of over 20 kHz at 1 h/time for 50 times. After each ultrasonic dispersion process, the turbid solution was stirred at 300 r/min for 1 h to lower the temperature to room temperature, and then the next ultrasonic dispersion process was performed. The turbid solution treated by the ultrasonic dispersion process was transferred into a fume chamber and continuously stirred at a stirring rate of 300 r/min. After stirred for 24 h, the solution substantially evaporated to dryness, and viscous and preliminarily surface-treated white carbon was obtained, which was a light blue and semitransparent solid. Now, silica was transferred into an oven and dried at 80° C. for 6 h; after the oven temperature was adjusted to 150° C., silica was dried for another 2 h to obtain fumed silica modified by the coupling agent. The following processing steps and requirements were the same as in Embodiment 1.

Embodiment 41

To a mixture of 2 L of anhydrous ethanol and 120 ml of deionized water, potassium carbonate was added to obtain a solution with a pH value of 8, and then 1.5 g of N-(β-amino ethyl)-γ-aminopropylmethylbimethoxysilane was added into the solution. The mixed solution was then allowed to stand for 4 h until a clear and transparent solution was formed. 3 g of fumed silica was weighed and added into the solution under slow stirring at a stirring rate of 100 r/min to avoid the increase of the solution viscosity. The mixed solution of the coupling agent sol and silica was dispersed under ultrasonic wave at an ultrasonic frequency of over 20 kHz at 30 min/time for 10 times. After each ultrasonic dispersion process, the turbid solution was stirred at 300 r/min for 1 h to lower the temperature to room temperature, and then the next ultrasonic dispersion process was performed. The turbid solution treated by the ultrasonic dispersion process was transferred into a fume chamber and continuously stirred at a stirring rate of 300 r/min. After stirred for 72 h, the solution substantially evaporated to dryness, and viscous and preliminarily surface-treated white carbon was obtained, which was a light blue and semitransparent solid. Now, silica was transferred into an oven and dried at 80° C. for 6 h; after the oven temperature was adjusted to 150° C., silica was dried for another 2 h to obtain fumed silica modified by the coupling agent. The following processing steps and requirements were the same as in Embodiment 1.

Embodiment 42

To a mixture of 2 L of anhydrous ethanol and 120 ml of deionized water, potassium hydrogen carbonate was added to obtain a solution with a pH value of 12, and then 500 g of N-(β-amino ethyl)-γ-aminopropylmethylbimethoxysilane was added into the solution. The mixed solution was then allowed to stand for 48 h until a clear and transparent solution was formed. 1000 g of fumed silica was weighed and added into the solution under slow stirring at a stirring rate of 100 r/min to avoid the increase of the solution viscosity. The mixed solution of the coupling agent sol and silica was dispersed under ultrasonic wave at an ultrasonic frequency of over 20 kHz at 1 h/time for 50 times. After each ultrasonic dispersion process, the turbid solution was stirred at 300 r/min for 1 h to lower the temperature to room temperature, and then the next ultrasonic dispersion process was performed. The turbid solution treated by the ultrasonic dispersion process was transferred into a fume chamber and continuously stirred at a stirring rate of 300 r/min. After stirred for 24 h, the solution substantially evaporated to dryness, and viscous and preliminarily surface-treated white carbon was obtained, which was a light blue and semitransparent solid. Now, silica was transferred into an oven and dried at 80° C. for 6 h; after the oven temperature was adjusted to 150° C., silica was dried for another 2 h to obtain fumed silica modified by the coupling agent. The following processing steps and requirements were the same as in Embodiment 1.

Embodiment 43

To a mixture of 1 L of Acetone and 1 L of deionized water, ammonia water was added to obtain a solution with a pH value of 8, and then 8 g of γ-aminopropyltriethoxysilane was added into the solution. The mixed solution was then allowed to stand for 2 h until a clear and transparent solution was formed. 16 g of fumed silica was weighed and added into the solution under slow stirring at a stirring rate of 100 r/min to avoid the increase of the solution viscosity. The mixed solution of the coupling agent sol and silica was dispersed under ultrasonic wave at an ultrasonic frequency of over 20 kHz at 30 min/time for 10 times. After each ultrasonic dispersion process, the turbid solution was stirred at 300 r/min for 1 h to lower the temperature to room temperature, and then the next ultrasonic dispersion process was performed. The turbid solution treated by the ultrasonic dispersion process was transferred into a fume chamber and continuously stirred at a stirring rate of 300 r/min. After stirred for 100 h, the solution substantially evaporated to a constant weight, and viscous and preliminarily surface-treated white carbon was obtained, which was a light blue and semitransparent solid. Now, silica was transferred into an oven and dried at 80° C. for 6 h; after the oven temperature was adjusted to 150° C., silica was dried for another 2 h to obtain fumed silica modified by the coupling agent. The following processing steps and requirements were the same as in Embodiment 1.

Embodiment 44

To a mixture of 1 L of anhydrous ethanol and 1 L of deionized water, ammonia water was added to obtain a solution with a pH value of 10, and then 300 g of γ-aminopropyltriethoxysilane was added into the solution. The mixed solution was then allowed to stand for 48 h until a clear and transparent solution was formed. 2000 g of fumed silica was weighed and added into the solution under slow stirring at a stirring rate of 100 r/min to avoid the increase of the solution viscosity. The mixed solution of the coupling agent sol and silica was dispersed under ultrasonic wave at an ultrasonic frequency of over 20 kHz at 1 h/time for 50 times. After each ultrasonic dispersion process, the turbid solution was stirred at 300 r/min for 1 h to lower the temperature to room temperature, and then the next ultrasonic dispersion process was performed. The turbid solution treated by the ultrasonic dispersion process was transferred into a fume chamber and continuously stirred at a stirring rate of 300 r/min. After stirred for 24 h, the solution substantially evaporated to dryness, and viscous and preliminarily surface-treated white carbon was obtained, which was a light blue and semitransparent solid.

Now, silica was transferred into an oven and dried at 80° C. for 6 h; after the oven temperature was adjusted to 150° C., silica was dried for another 2 h to obtain fumed silica modified by the coupling agent. The following processing steps and requirements were the same as in Embodiment 1.

Comparative Embodiment 1

The precipitated silica used is from Degussa VN3 and bought directly from the market.

Comparative Embodiment 2

The fumed silica used is from Degussa A200 and bought directly from the market.

| Sample | Average particle size | Particle size distribution | BET |
|---|---|---|---|
| Comparative embodiment 1 | 349.4 | 210-6400 | 175 |
| Embodiment 1 | 268.5 | 183-750 | 190.9 |
| Embodiment 2 | 266.1 | 181-660 | 192.3 |
| Embodiment 3 | 269.7 | 183-752 | 189.5 |
| Embodiment 4 | 272.5 | 185-670 | 188.2 |
| Embodiment 5 | 287.6 | 187-889 | 186.2 |
| Embodiment 6 | 289.6 | 186-850 | 187.5 |
| Embodiment 7 | 268.3 | 186-620 | 194.3 |
| Embodiment 8 | 268.8 | 187-629 | 192.6 |
| Embodiment 9 | 273.6 | 186-794 | 196.2 |
| Embodiment 10 | 278.8 | 188-1010 | 180.2 |
| Embodiment 11 | 263.1 | 183-610 | 191.2 |
| Embodiment 12 | 273.6 | 189-810 | 183.2 |
| Embodiment 13 | 275.3 | 188-1006 | 181.2 |
| Embodiment 26 | 288.9 | 180-844 | 188.2 |
| Embodiment 27 | 265.5 | 181-654 | 192.1 |
| Embodiment 28 | 269.1 | 183-743 | 188.9 |
| Embodiment 29 | 287.0 | 184-880 | 186.8 |
| Embodiment 30 | 267.8 | 186-612 | 194.7 |
| Embodiment 31 | 274.5 | 186-800 | 195.3 |
| Embodiment 32 | 279.6 | 190-1020 | 179.1 |
| Embodiment 33 | 261.2 | 183-605 | 192.3 |

-continued

| Sample | Average particle size | Particle size distribution | BET |
|---|---|---|---|
| Embodiment 34 | 273.0 | 181-810 | 184.5 |
| Embodiment 35 | 275.9 | 190-1020 | 180.6 |

The related parameters of the precipitated silica pretreated and treated

| Sample | Average particle size (nm) | Particle size distribution (nm) | BET (m²/g) |
|---|---|---|---|
| Comparative embodiment 2 | 306 | 405-4220 | 183.2 |
| Embodiment 14 | 197.2 | 103-232 | 199.2 |
| Embodiment 15 | 176.5 | 86-200 | 213.5 |
| Embodiment 16 | 200.9 | 100-240 | 196.3 |
| Embodiment 17 | 233.3 | 124-320 | 190.2 |
| Embodiment 18 | 262.5 | 152-460 | 186.1 |
| Embodiment 19 | 231.1 | 130-560 | 182.2 |
| Embodiment 20 | 153.2 | 85-230 | 213.3 |
| Embodiment 21 | 258.1 | 130-637 | 181.3 |
| Embodiment 22 | 263.1 | 160-652 | 181.1 |
| Embodiment 23 | 160.2 | 88-260 | 206.3 |
| Embodiment 24 | 267.4 | 163-680 | 180.3 |
| Embodiment 25 | 266.2 | 170-685 | 180.6 |
| Embodiment 37 | 196.9 | 103-236 | 198.9 |
| Embodiment 38 | 176.2 | 84-205 | 212.4 |
| Embodiment 39 | 201.3 | 102-243 | 195.8 |
| Embodiment 40 | 263.5 | 158-466 | 185.6 |
| Embodiment 41 | 152.8 | 85-237 | 213.6 |
| Embodiment 42 | 247.8 | 126-385 | 192.6 |
| Embodiment 43 | 161.5 | 88-269 | 205.8 |
| Embodiment 44 | 266.9 | 176-685 | 181.1 |

The invention claimed is:

1. A method for preparing silica modified by a silane coupling agent, comprising:
   (a) adding water to an organic solvent;
   (b) adjusting pH value of the mixture of step (a) to either below 6 by adding an acid or over 8 by an alkali;
   (c) adding the coupling agent to the mixture of step (b), wherein the molar ratio of the coupling agent to water is in the range of 1:0.1-1:10000;
   (d) letting the mixture of step (c) stand for 0.5-48 h, whereby a stabilized sol solution of the coupling agent is formed;
   (e) adding silica to the sol solution to produce precipitated silica in an amount less than 10 g/ml and fumed silica in an amount less than 1 g/ml, g/ml being a mass to volume ratio of the silica to the so solution;
   (f) dispersing the silica fully into the sol solution to make a uniformly-dispersed turbid solution by one of the following dispersing methods:
      (1) performing 1-100 ultrasonic dispersion processes on the mixture of step (e) for a total of over 1 h under an ultrasonic frequency of over 20 kHz to produce a turbid solution, wherein each ultrasonic dispersion process lasts 10 min-1 h, and wherein the temperature of the turbid solution is lowered to room temperature by stirring the turbid solution between two ultrasonic dispersion processes,
      (2) performing 1-100 shearing dispersion processes on the mixture of step (e) at a shearing rate of over 1000 r/min using a shear blender to produce a turbid solution, wherein each shearing dispersion process lasts 10 min-10 h, and wherein the temperature of the turbid solution is lowered to room temperature by stirring the turbid solution between two shearing dispersion processes, or
      (3) stirring the mixture of step (e) at a stirring rate of greater than 300 r/min for 0.5-168 h to produce a turbid solution;
   (g) stirring and evaporating the uniformly-dispersed turbid solution at room temperature to produce a mixture having a weight that is 0.1%-50% of the weight of the turbid solution of step (f);
   (h) heating a stirring the mixture of step (g) at 50-80° C. for 0.5-120 h and then at 81-260° C. for 0.5-48 h; and
   (i) drying and crushing the mixture of step (h),
   wherein each of steps (a)-(g) and (l) is carried out, at a temperature less than 50° C.,
   whereby, silica modified by the coupling agent is obtained.

2. The method according to claim 1, wherein the organic solvent is selected from the group consisting of anhydrous ethanol, methanol, acetone, n-propanol, isopropanol, ethylene glycol, propylene glycol, dimethylformamide and dimethylsulfoxide, and wherein the volume ratio of the organic solvent to water is 0.1%-100%.

3. The method according to claim 1, wherein the acid is selected from the group consisting of hydrochloric acid, hydrofluoric acid, sulfuric acid, sulfurous acid, carbonic acid, perchloric acid, nitric acid, nitrous acid, glacial acetic acid, hydrocyanic acid and adipic acid.

4. The method according to claim 1, wherein the alkali is selected from the group consisting of ammonia, sodium oxide, magnesium oxide, potassium hydroxide, sodium hydroxide, potassium hydroxide, magnesium hydroxide, calcium hydroxide, aluminum hydroxide, barium hydroxide, sodium carbonate, sodium bicarbonate, ammonium carbonate, ammonium bicarbonate, calcium carbonate, potassium carbonate and potassium bicarbonate.

5. The method according to claim 1, wherein the coupling agent is selected from the group consisting of N-(β-aminoethyl)-γ-aminopropylmethylbimethoxysilane, N-(β-aminoethyl)-γ-aminopropyltrimethoxy(ethoxy)silane, methyl triethoxysilane, vinyl triethoxysilane, vinyltrimethoxysilane, γ-glycidyloxypropyltrimethoxysilane, bis-(γ-triethoxysilylpropyl)-tetrasulfide, γ-mercaptopropyltrimethoxysilane, bis-(gamma-(triethoxysilyl)propyl)-disulfide, γ-aminopropyl triethoxysilane, γ-(methacryloxy)propyltrimethoxysilane; dimethyldichlorosilane; polydimethylsiloxane, hexamethyldisiloxane, octamethyltrisiloxane, tetradecamethyltetrasiloxane, 1,3,5,7-tetramethyl-1,3,5,7-tetravinylcyclotetrasiloxane, 1,3,5,7-tetramethyl-1,3,5,7-tetrahydrocyclotetrasiloxane, hexamethylcyclotrisiloxane, octamethylcyclosiloxane, trimethylethoxysilane, methyltrimethoxysilane, vinyltriethoxysilane, tetrabutoxysilane, hexamethylethylsilazane, hexamethyldisilazane, and a silazane, and wherein the mass fraction of the coupling agent to the silica is 0.01%-50%.

6. The method according to claim 1, wherein the turbid solution is stirred at a stirring rate of greater than 30 r/min for 10 min-5 h to lower the temperature of the turbid solution to room temperature between two ultrasonic dispersion processes.

7. The method according to claim 1, wherein the turbid solution Is stirred at a stirring rate of greater than 30 r/min for 10 min-5 h to lower the temperature of the turbid solution to room temperature between two shearing dispersion processes.

* * * * *